(12) United States Patent
Hwang et al.

(10) Patent No.: US 12,597,825 B2
(45) Date of Patent: Apr. 7, 2026

(54) MOTOR AND CLEANER COMPRISING THE SAME

(71) Applicant: SAMSUNG ELECTRONICS CO., LTD., Suwon-si (KR)

(72) Inventors: Woong Hwang, Suwon-si (KR); Younmo Kang, Suwon-si (KR); Jihoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 18/349,689

(22) Filed: Jul. 10, 2023

(65) Prior Publication Data

US 2023/0353013 A1      Nov. 2, 2023

Related U.S. Application Data

(63) Continuation of application No. PCT/KR2022/001811, filed on Feb. 7, 2022.

(30) Foreign Application Priority Data

Mar. 30, 2021      (KR) ........................ 10-2021-0041224

(51) Int. Cl.
*H02K 7/04*        (2006.01)
*A47L 5/22*        (2006.01)
(Continued)

(52) U.S. Cl.
CPC .................. *H02K 7/04* (2013.01); *A47L 5/28* (2013.01); *A47L 9/22* (2013.01); *H02K 5/1732* (2013.01); *H02K 7/083* (2013.01)

(58) Field of Classification Search
CPC ........ H02K 7/04; H02K 5/1732; H02K 7/083; A47L 5/28; A47L 9/22; F04D 29/329;
(Continued)

(56) References Cited

U.S. PATENT DOCUMENTS

| | | | | | |
|---|---|---|---|---|---|
| 1,762,140 A | * | 6/1930 | Blakemore | ............. | F16F 15/32 |
| | | | | | 416/193 A |
| 3,961,864 A | * | 6/1976 | Papst | .................... | F04D 25/082 |
| | | | | | 415/217.1 |

(Continued)

FOREIGN PATENT DOCUMENTS

| | | |
|---|---|---|
| CN | 202811489 U | 3/2013 |
| CN | 208565065 U | 3/2019 |

(Continued)

OTHER PUBLICATIONS https://www.ebay.com/itm/155683799992. Accessed May 2025 (Year: 2025).*

(Continued)

*Primary Examiner* — Burton S Mullins
(74) *Attorney, Agent, or Firm* — ISTAAS & HALSEY LLP

(57) ABSTRACT

A motor comprising: a stator; a rotating shaft arrangeable inside the stator; a rotor rotatable about the rotating shaft by electromagnetically interacting with the stator while the rotating shaft is arranged inside the stator; and an impeller coupleable to the rotating shaft to generate a flow of air. A protrusion or a groove is formed on the impeller to correct for an imbalance of the impeller.

10 Claims, 10 Drawing Sheets

(51) Int. Cl.

| | |
|---|---|
| *A47L 5/28* | (2006.01) |
| *A47L 9/22* | (2006.01) |
| *F04D 25/06* | (2006.01) |
| *H02K 5/173* | (2006.01) |
| *H02K 7/08* | (2006.01) |

(58) Field of Classification Search
CPC ........ F04D 29/662; F04D 25/06; F16F 15/32;
F01D 5/027
USPC ........................................... 416/144; 310/51
See application file for complete search history.

(56) References Cited

U.S. PATENT DOCUMENTS

| | | | | |
|---|---|---|---|---|
| 5,591,008 | A * | 1/1997 | Wrobel | ................. F04D 29/281 |
| | | | | 416/144 |
| 5,695,318 | A * | 12/1997 | Harmsen | ................. F04D 17/06 |
| | | | | 415/218.1 |
| 6,841,912 | B2 * | 1/2005 | Yamada | .............. F04D 25/0606 |
| | | | | 310/156.28 |
| 8,029,251 | B2 * | 10/2011 | Oguma | .............. F04D 25/0613 |
| | | | | 417/354 |
| 8,147,199 | B2 | 4/2012 | Tsai et al. | |
| 8,636,479 | B2 * | 1/2014 | Kenyon | ................. H02K 1/185 |
| | | | | 417/423.5 |
| 9,951,786 | B2 * | 4/2018 | Elebiary | ............ F04D 29/2266 |
| 10,001,133 | B2 | 6/2018 | Doll et al. | |
| 10,465,713 | B2 | 11/2019 | Seike et al. | |
| 11,962,221 | B2 | 4/2024 | Kim et al. | |
| 2010/0196174 | A1 | 8/2010 | Lee | |
| 2014/0134012 | A1 * | 5/2014 | Cho | ........................ F04D 17/16 |
| | | | | 417/354 |
| 2014/0183994 | A1 * | 7/2014 | Kim | ....................... H02K 11/33 |
| | | | | 310/72 |
| 2015/0351599 | A1 * | 12/2015 | Park | ..................... F04D 29/541 |
| | | | | 310/68 B |
| 2017/0097008 | A1 | 4/2017 | Doll et al. | |
| 2017/0126076 | A1 * | 5/2017 | Yoon | ................... F04D 25/0606 |
| 2017/0159669 | A1 | 6/2017 | Fang et al. | |
| 2017/0194833 | A1 * | 7/2017 | Bang | ......................... A47L 9/22 |
| 2018/0242800 | A1 * | 8/2018 | Hayamitsu | ................ A47L 5/22 |
| 2018/0249873 | A1 * | 9/2018 | Yoshida | ................... A47L 5/24 |
| 2019/0021562 | A1 | 1/2019 | Shiozawa et al. | |
| 2020/0195091 | A1 * | 6/2020 | Kim | ..................... F04D 29/043 |

FOREIGN PATENT DOCUMENTS

| | | | |
|---|---|---|---|
| CN | 109276183 B | 5/2021 | |
| CS | 273542 B1 * | 3/1991 | ............ F04D 29/66 |
| JP | 2008-291657 | 12/2008 | |
| JP | 2017-44190 | 3/2017 | |
| JP | 2017-115866 | 6/2017 | |
| JP | 7145588 | 10/2022 | |
| KR | 10-2009-0029439 | 3/2009 | |
| KR | 20-0472439 | 4/2014 | |
| KR | 10-2016-0067669 | 6/2016 | |
| KR | 10-2017-0073278 | 6/2017 | |
| KR | 10-2018-0054850 | 5/2018 | |
| KR | 10-1855707 | 5/2018 | |
| KR | 10-2020-0076858 | 6/2020 | |
| KR | 10-2141392 | 8/2020 | |
| KR | 10-2022-0109838 | 8/2022 | |

OTHER PUBLICATIONS

International Search Report dated May 23, 2022 in International Patent Application No. PCT/KR2022/001811.
PCT/ISA/237 dated May 23, 2022 in International Patent Application No. PCT/KR2022/001811.
Office Action dated Apr. 11, 2025 issued in Korean Patent Application No. 10-2021-0041224.

* cited by examiner

MOTOR AND CLEANER COMPRISING THE SAME

CROSS-REFERENCE TO RELATED APPLICATION

This application is a continuation application, under 35 U.S.C. § 111(a), of international application No. PCT/KR2022/001811, filed on Feb. 7, 2022, which claims priority under 35 U. S. C. § 119 to Korean Patent Application No. 10-2021-0041224, filed Mar. 30, 2021, the disclosures of which are incorporated herein by reference in their entireties.

BACKGROUND

Field

The present disclosure relates to a motor and a cleaner including the same, and more particularly, to a cleaner including a motor having improved productivity by removing a weight balancer.

Description of Related Art

In general, a motor is a machine that obtains a rotational force from electrical energy, and includes a stator and a rotor. The rotor is configured to interact electromagnetically with the stator and configured to be rotated by a force acting between a magnetic field and a current flowing in a coil.

The motor may include the stator, the rotor configured to be rotated, a housing accommodating the stator and the rotor, and a bearing configured to stably rotate the rotor by combining the stator and the rotor at an accurate position.

The motor may be used in a variety of cleaners. For example, the motor may be disposed in a main body of the cleaner to generate power.

The motor used in the cleaner may vibrate greatly due to high-speed rotation, and the vibration may cause noise in the cleaner. In addition, the motor for the cleaner may include an impeller generating a flow of air.

Most of the motor vibration is 1× vibration, and 1× vibration is caused by an imbalance of a rotor assembly.

Conventionally, a balancing process of adding a weight balancer to the rotor assembly or removing a part of the weight balancer after adding the weight balancer has been performed to correct for the imbalance of the rotor assembly.

However, due to the process of assembling the weight balancer to the rotor assembly, the balancing process of the weight balancer, and a material cost of the weight balancer, the production cost and time required for production of the motor increased, and the productivity of the motor decreased.

SUMMARY

One aspect of the present disclosure provides a motor including a stator, a rotating shaft arrangeable inside the stator, a rotor rotatable about the rotating shaft by electromagnetically interacting with the stator while the rotating shaft is arranged inside the stator, and an impeller coupleable to the rotating shaft to generate a flow of air. A protrusion or a groove may be formed on the impeller to correct for an imbalance of the impeller.

The impeller may include a shaft coupler to which the rotating shaft is coupleable, a hub extending from an outer surface of the shaft coupler so as to allow the shaft coupler to be arranged at a center of the impeller, and a plurality of blades protruding from one surface of the hub.

The protrusion or the groove may be formed on another surface of the hub which is opposite to the one surface of the hub from which the plurality of blades protrude.

The protrusion or the groove may be formed at a position adjacent to a rim of the hub.

The protrusion may be among a plurality of protrusions formed on the impeller to correct for the imbalance of the impeller.

The plurality of protrusions may be spaced apart from each other along an outer edge of the hub.

The groove may among a plurality of grooves formed on the impeller to correct for the imbalance of the impeller.

The plurality of grooves may be spaced apart from each other along the outer edge of the hub.

The impeller may further include a plurality of recesses formed thereon to correct for the imbalance of the impeller.

The plurality of recesses may be spaced apart from each other in an axial direction of the rotating shaft.

Each of the plurality of recesses may be formed by cutting at least a portion of the impeller.

The protrusion or the groove may be injected-molded together with the impeller which is injected-molded.

An outer radius of the rotor may be less than 5 mm to reduce a centrifugal force of the rotor.

When an outer radius of the rotor is r and a length of the rotor along an axial direction of the rotating shaft is t, an equation r/t=0.17 to 0.26 may be satisfied.

The motor may further include a housing to accommodate the stator and the rotor, and a bearing, coupleable to the housing, to support the rotating shaft to allow the stator and the rotor to be rotated while maintaining a predetermined gap therebetween.

The housing may include a first housing to cover one side of the stator and the rotor, and a second housing to cover another side of the stator and the rotor.

The bearing may include a first bearing coupleable to the first housing and a second bearing coupleable to the second housing.

A rotor assembly, with which the impeller, the rotor, the first bearing, and the second bearing are coupleable to the rotating shaft, may be coupleable to the housing by passing through the first housing or the second housing.

The first housing or the second housing may include an opening larger than an outer diameter of the first bearing or the second bearing to allow the rotor assembly to pass therethrough.

Another aspect of the present disclosure provides a cleaner including a main body, a suction head configured to suction foreign substances on a surface to be cleaned into the main body, and a motor arrangeable inside the main body to generate a suction force. The motor includes a stator, a rotor arrangeable inside the stator and configured to be rotated about the rotating shaft by electromagnetically interacting with the stator, a rotating shaft configured to be rotated together with the rotor inside the stator, and an impeller configured to be rotated by being coupleable to the rotating shaft, to generate a flow of air. A plurality of protrusions or a plurality of grooves may be formed on the impeller to correct for an imbalance of the impeller.

The impeller may include a shaft coupler to which the rotating shaft is coupleable, a hub extending from an outer surface of the shaft coupler so as to allow the shaft coupler to be arranged at a center, and a plurality of blades protruding from one surface of the hub. The plurality of protrusions or the plurality of grooves may be formed on another surface of the hub which is opposite to the one surface of the hub from which the plurality of blades protrude.

The plurality of protrusions or the plurality of grooves may be spaced apart from each other along an outer edge of the hub to be adjacent to a rim of the hub.

The impeller may further include a plurality of recesses formed on the impeller to correct for the imbalance of the impeller.

The plurality of recesses may be spaced apart from each other along an axial direction of the rotating shaft.

The plurality of protrusions or the plurality of grooves may be injected-molded together with the impeller which is injected-molded.

Each of the plurality of recesses may be formed by cutting at least a portion of the impeller.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
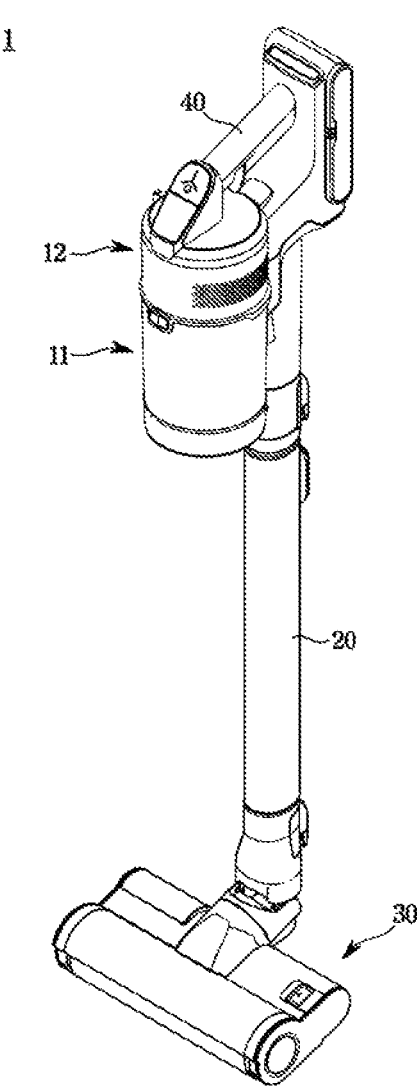
FIG. 1 is a view of a cleaner including a motor according to one embodiment of the present disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function. Shapes and sizes of elements in the drawings may be exaggerated for clear description.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front side", "rear side", "left side", "right side", and the like may be defined by the drawings, but the shape and the location of the component is not limited by the term.

In addition, according to various embodiments of the present disclosure, it may be used in various home appliances including cleaners, but hereinafter a cleaner will be described.

The present disclosure is directed to providing a motor capable of improving stability at high-speed rotation, reducing a material cost, and simplifying an assembly process by removing a weight balancer, and a cleaner including the same.

Further, the present disclosure is directed to providing a motor capable of improving productivity and reducing a weight thereof by removing a weight balancer, and a cleaner including the same.

Further, the present disclosure is directed to providing a motor capable of correcting for an imbalance of a rotor assembly through an impeller, and a cleaner including the same.

A motor and a cleaner may improve stability at high-speed rotation, reduce a material cost, and simplify an assembly process by removing a weight balancer.

Further, a motor and a cleaner may improve productivity and reduce a weight thereof by removing a weight balancer.

Further, a motor and a cleaner may correct for an imbalance of a rotor assembly through an impeller.

Disclosed herein are a motor capable of improve stability at high-speed rotation, reducing a material cost, and simplifying an assembly process by removing a weight balancer, and a cleaner comprising the same.

The disclosure will be described more fully hereinafter with reference to the accompanying drawings.

FIG. 1 is a view of a cleaner including a motor according to one embodiment of the present disclosure.

Referring to FIG. 1, a cleaner 1 according to one of embodiments of the present disclosure may include a motor 100. There is no limitation in the type of cleaner 1. For example, the motor 100 may be used in a stick type cleaner or an upright type cleaner.

In addition, the motor 100 may be applied to various home appliances other than cleaners. Hereinafter the stick type cleaner 1 including the motor 100 will be mainly described.

The cleaner 1 may include a cleaner main body 10 and a suction head 30. The cleaner 1 may include a pipe 20 connecting the cleaner main body 10 and the suction head 30, and a handle 40 connected to the cleaner main body 10.

The handle 40 may be a part coupled to the cleaner main body 10, and may be provided to be held by a user and to allow the user to operate the cleaner 1. A manipulator (not shown) may be provided on the handle 40 to allow a user to operate the cleaner 1.

The suction head 30 may be under the cleaner main body 10 and may be disposed to come into contact with a surface to be cleaned. The suction head 30 may come into contact with the surface to be cleaned and configured to move dust or dirt from the surface to be cleaned into the cleaning main body 10 with a suction force generated from the motor 100.

The cleaner main body 10 may include a dust collector 11 and a driving device 12 provided therein. The dust collector 11 may be provided to collect dust or dirt of the surface to be cleaned that is sucked from the suction head 30.

The driving device 12 may include the motor 100 configured to drive the cleaner 1. The motor 100 may generate power to generate a suction force inside the cleaner main body 10.

Figure 2:
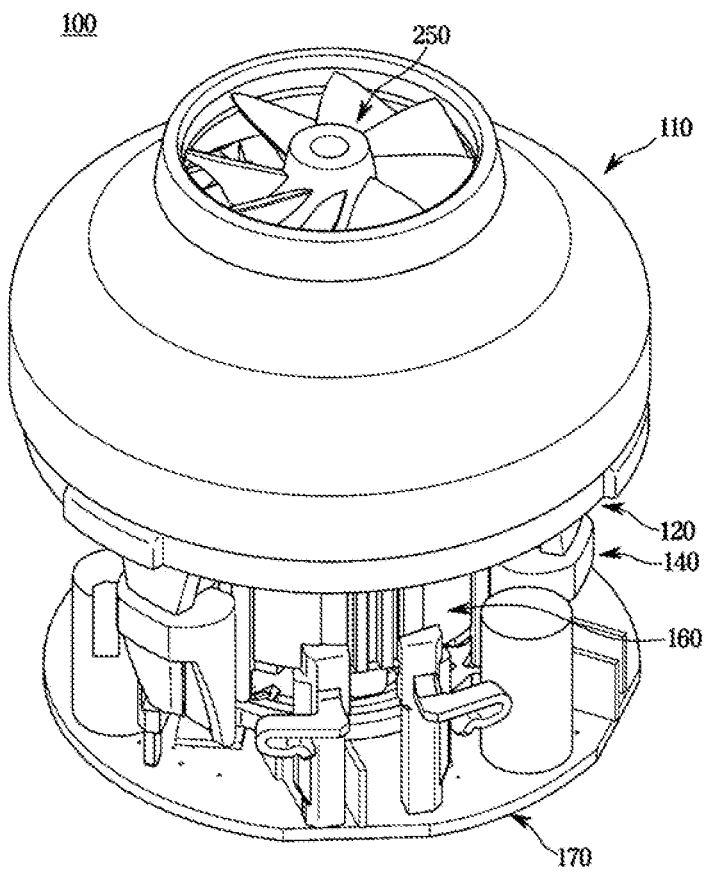
FIG. 2 is a perspective view of the motor according to one embodiment of the present disclosure.
Figure 3:
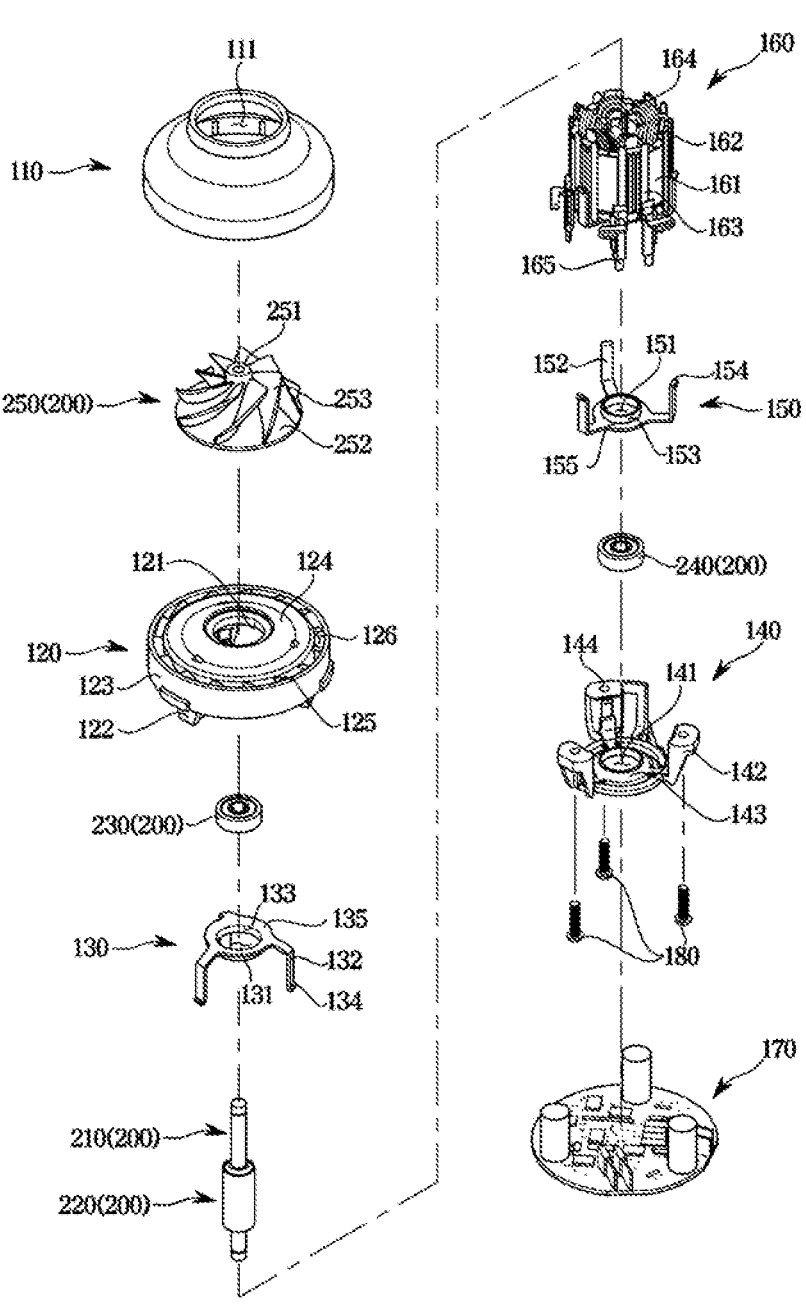
FIG. 3 is an exploded perspective view of the motor according to one embodiment of the present disclosure.
Figure 4:
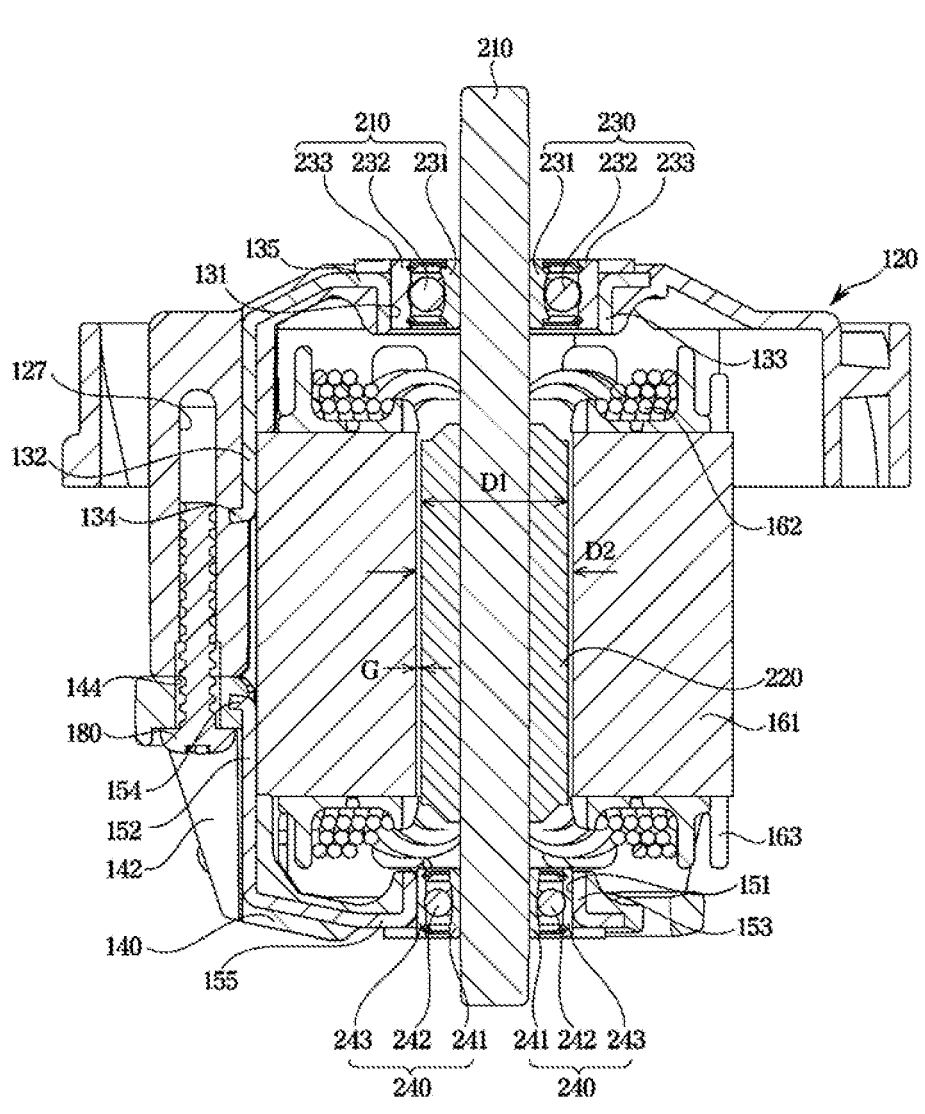
FIG. 4 is a cross-sectional view of some components of the motor according to one embodiment of the present disclosure.

FIG. 2 is a perspective view of the motor according to one embodiment of the present disclosure. FIG. 3 is an exploded perspective view of the motor according to one embodiment of the present disclosure. FIG. 4 is a cross-sectional view of some components of the motor according to one embodiment of the present disclosure.

Referring to FIGS. 2 to 4, the motor 100 may include a stator 160, a rotor assembly 200, and housings 120 and 140 provided to receive the stator 160 and the rotor assembly 200.

The rotor assembly 200 may include a rotor 220, a rotating shaft 210 coupled to the rotor 220 so as to be rotated together with the rotor 220, an impeller 250 coupled to the rotating shaft 210 so as to generate a flow of air, and bearings 230 and 240 provided to rotatably support the rotating shaft 210 against the housings 120 and 140.

The motor 100 may include a cover 110 provided to cover the impeller 250 and provided to guide air suctioned by the impeller 250, and a controller 170 configured to control the motor.

The stator 160 may include a stator core 161, a stator coil 162, an insulator 163, and a rotor receiving member 164. The stator 160 may be configured to generate magnetic flux when a current is applied to the stator coil 162.

The rotor receiving member 164 for receiving the rotor 220 may be provided at the center of the stator core 161. The rotor 220 may be disposed in the rotor receiving member 164. The rotor 220 may electromagnetically interact with the stator 160.

The stator coil 162 may be wound around the stator core 161 in a state in which the insulator 163 is coupled to the stator core 161.

The insulator 163 may be formed of a material having electrical insulation. The insulator 163 insulates the stator core 161 and the stator coil 162 by surrounding the stator core 161.

The stator 160 may include an insertion member 165 provided at a lower end of the insulator 163. The insertion member 165 may be provided to be inserted into the controller 170.

The rotor assembly 200 may include the rotor 220 configured to be rotated on an inner side of the stator 160. The rotor 220 may be provided as a permanent magnet having magnetism or a coil having electromagnetic properties. Accordingly, the rotor 220 may be configured to be rotated by electromagnetically interacting with the stator 160. In one embodiment of the present disclosure, it is assumed that the rotor 220 is provided with a permanent magnet.

The rotor assembly 200 may include the rotating shaft 210. The rotating shaft 210 may be configured to be rotated together with the rotor 220 when the rotor 220 electromagnetically interacts with the stator 160.

The rotor assembly 200 may include the impeller 250 coupled to the rotating shaft 210 to generate a flow of air.

The impeller 250 may include a shaft coupler 251 to which the rotating shaft 210 is coupled. When the rotating shaft 210 is coupled to the shaft coupler 251, the impeller 250 may rotate together with the rotating shaft 210.

The impeller 250 may include a hub 252 and a plurality of blades 253 protruding from the hub 252 to form a flow of air.

The hub 252 may be provided in such a way that a cross-sectional area thereof becomes smaller in an axial direction of the rotating shaft 210. The hub 252 may be provided to discharge air, which is introduced in the axial direction, to a radial direction of the rotating shaft 210. Particularly, the hub 252 may be provided in such a way that a cross-sectional area thereof becomes smaller toward the upper side when the rotating shaft 210 is arranged to extend in the vertical direction. In other words, the hub 252 may be formed to extend from an outer surface of the shaft coupler 251 to allow the shaft coupler 251 to be disposed at the center.

The impeller 250 may include the plurality of blades 253 protruding from one surface of the hub 252. The plurality of blades 253 may be provided to be rotated together with the hub 252 to form a flow of air. The plurality of blades 253 may be provided on an outer surface of the hub 252. The plurality of blades 253 and the hub 252 may be integrally formed with each other.

By including the plurality of blades 253, the impeller 250 may allow air, which is introduced from the upper side of the hub 252, to be discharged radially outward of the rotating shaft 210.

A first bearing 230 described later may be arranged in an inside of the hub 252 that is covered by an inner surface of the hub 252. The inner surface of the hub 252 may refer to the other surface of the hub 252. The one surface of the hub 252 may refer to an outer surface of the hub 252 on which the plurality of blades 253 is disposed.

The motor 100 may include the cover 110 provided to cover the impeller 120. The cover 110 may include a guide member (not shown) provided to guide the air sucked by the impeller 120. The cover 110 may be provided to be coupled to an upper housing 120. The cover 110 may include an opening 111 provided to allow air to be sucked into the impeller 250.

The housings 120 and 140 may be provided to accommodate the stator 160 and the rotor assembly 200. The housings 120 and 140 may be formed by injection molding. Therefore, because the housings 120 and 140 use an injection-molded material, the housings 120 and 140 may have a relatively light weight compared to a housing formed of metal. The housings 120 and 140 may include the upper housing 120 and a lower housing 140. The upper housing 120 may be a first housing 120 and the lower housing 140 may be a second housing 140.

The upper housing 120 and the lower housing 140 may be coupled to the rotor 220 and the stator 160 interposed therebetween. Between the upper housing 120 and the lower housing 140 which are coupled, the rotor 220 may be coupled to the stator 160 at a distance.

The upper housing 120 may include an upper frame seating member 121 on which the first bearing 230 is seated. An upper frame 130 may be coupled to the upper frame seating member 121. For example, a first forming rib 133 may be coupled to the upper frame seating member 121, and the first bearing 230 may be seated in a first seating hole 131 formed by the first forming rib 133.

In addition, the upper housing 120 may include a first coupler 122 extending in the axial direction and coupled to the lower housing 140. The upper housing 120 may be provided in a substantially cylindrical shape, and may include an outer circumferential surface 123 provided to be coupled to the cover 110, and an upper surface 124 provided to cover an upper surface of the stator 160 and the rotor 220.

In addition, the upper housing 120 may include a flow path 126 through which air discharged from the impeller 250 flows, and a vane 125 provided to guide air flowing through the flow path 126. The vane 125 may be integrally formed with the upper housing 120. For example, the vane 125 may be formed by being injected-molded together the upper housing 120 when the upper housing 120 is injected-molded. Therefore, productivity may be improved because there is no need to separately produce a diffuser or assemble the diffuser to the upper housing 120.

The first coupler 122 may extend from the outer circumferential surface 123 of the upper housing 120 in the axial direction. The first coupler 122 may be spaced apart along a circumferential direction of the upper housing 120 and may be provided in plurality. For example, three first couplers 122 may be provided. In addition, the number of first couplers 122 is not limited thereto and may be provided in various numbers. The first coupler 122 may be an upper coupler 122.

The lower housing 140 may include a lower frame seating member 141 in which a second bearing 240 is seated. A lower frame 150 may be coupled to the lower frame seating member 141. For example, a second forming rib 153 may be coupled to the lower frame seating member 141, and the second bearing 240 may be seated in a second seating hole 151 formed by the second forming rib 153.

The lower housing 140 may include a base seating member 143 in which a second base 155 of the lower frame 150 is seated. The lower frame seating member 141 may be provided at a center of the base seating member 143.

The lower housing 140 may include a second coupler 142 provided to be coupled to the first coupler 122 of the upper housing. The number of the second couplers 142 may correspond to the number of the first couplers 122. The first coupler 122 and the second coupler 142 may be coupled by various known methods. For example, the first coupler 122 and the second coupler 142 may be coupled by force-fitting. The second coupler 142 may be a lower coupler 142.

According to one of embodiments of the present disclosure, the upper housing 120 and the lower housing 140 may be coupled by a fastener 180. For example, the fastener 180 may include a tapping screw 180. Therefore, the upper housing 120 and the lower housing 140 may be coupled without processing a separate tab on the housings 120 and 140, and thus the productivity of the motor may be increased.

The motor 100 may further include the frames 130 and 150. The frames 130 and 150 may be coupled to the inside of housings 120 and 140 to increase the rigidity of the housings 120 and 140. For example, the frames 130 and 150 may be integrally formed with the housings 120 and 140. In the drawings, it is illustrated that the frames 130 and 150 are separated, for the description. The frames 130 and 150 may be formed of metal. The frames 130 and 150 may be provided in plurality. The plurality of frames 130 and 150 may include the upper frame 130 and the lower frame 150.

The upper frame 130 may be a first frame 130, and the lower frame 150 may be a second frame 150. The frames 130 and 150 may be inserted when the housings 120 and 140 are injected-molded. For example, the frames 130 and 150 may be inserted before the housings 120 and 140 are injected-molded, and then the housings 120 and 140 may be injected-molded. Therefore, there is no need to perform a separate assembly process after each production, and the productivity of the motor may be increased.

The upper frame 130 may be coupled to the upper housing 120. The upper frame 130 may be integrally formed with the upper housing 120. For example, after inserting the upper frame 130, the upper housing 120 may be injected-molded. The upper frame 130 may include a first base 135, the first seating hole 131, a first contact rib 132, the first forming rib 133, and a first coupling rib 134.

The first seating hole 131 may be formed in the first base 135. The first bearing 230 may be seated in the first seating hole 131. The first seating hole 131 may be provided in a shape corresponding to the first bearing 230. The first seating hole 131 may be formed to correspond to the upper frame seating member 121.

The first contact rib 132 may extend downward from the first base 135. For example, the first contact rib 132 may extend downward from an outer circumferential surface of the first base 135. The first contact rib 132 may be in contact with the outer circumferential surface of the stator core 161 to prevent electric corrosion of the first bearing 230.

The first forming rib 133 may extend downward from the first base 135 to form the first seating hole 131. For example, the first forming rib 133 may extend downward to form the first seating hole 131 inside the first base 135.

The first coupling rib 134 may protrude outward from one end of the first contact rib 132. The first coupling rib 134 may be coupled to the upper housing 120. For example, the first coupling rib 134 may be provided in a shape corresponding to the inner surface of the upper housing 120. Accordingly, the upper frame 130 and the upper housing 120 may not be separated.

The lower frame 150 may be coupled to the lower housing 140. The lower frame 150 may be integrally formed with the lower housing 140. For example, after inserting the lower frame 150, the lower housing 140 may be injected-molded. The lower frame 150 may include the second base 155, the second seating hole 151, a second contact rib 152, the second forming rib 153, and a second coupling rib 154.

The second seating hole 151 may be formed in the second base 155. The second bearing 240 may be seated in the second seating hole 151. The second seating hole 151 may be provided in a shape corresponding to the second bearing 240. The second seating hole 151 may be formed to correspond to the lower frame seating member 141.

The second contact rib 152 may extend upward from the second base 155. For example, the second contact rib 152 may extend upward from an outer circumferential surface of the second base 155. The second contact rib 152 may be in contact with an outer circumferential surface of the stator core 161 to prevent electric corrosion of the second bearing 240.

The second forming rib 153 may extend upward from the second base 155 to form the second seating hole 151. For example, the second forming rib 153 may extend upward to form the second seating hole 151 inside the second base 155.

The second coupling rib 154 may protrude outward from one end of the second contact rib 152. The second coupling rib 154 may be coupled to the lower housing 140. For example, the second coupling rib 154 may be provided in a shape corresponding to the inner surface of the lower housing 140. Accordingly, the lower frame 150 and the lower housing 140 may not be separated.

The rotor assembly 200 may include the bearings 230 and 240 provided to rotatably support the rotating shaft 210 and coupled to the housings 120 and 140.

The bearings 230 and 240 may include the first bearing 230 coupled to an upper side of the rotating shaft 210 and the second bearing 240 coupled to a lower side of the rotating shaft 210. The first bearing 230 may be disposed between the upper housing 120 and the rotating shaft 210 to support the rotating shaft 210 so as to allow the rotating shaft 210 to be rotated while a rotation axis of the rotating shaft 210 is fixed. The second bearing 240 may be disposed between the lower housing 140 and the rotating shaft 210 to support the rotating shaft 210 so as to allow the rotating shaft 210 to be rotated while the rotation axis of the rotating shaft 210 is fixed.

The motor 100 may further include the controller 170 configured to control the speed of the motor. The controller 170 may be disposed below the motor, but is not limited thereto. The controller 170 may be disposed in various positions according to the type of cleaner.

According to one embodiment of the present disclosure, the upper housing 120 may include a first fastener hole 127. The fastener 180 may be inserted into the first fastener hole 127. The fastener 180 may be inserted to couple the upper housing 120 and the lower housing 140 together. The fastener 180 may be the tapping screw 180. The tapping screw 180 may couple the upper housing 120 and the lower housing 140 while forming a spiral groove in the first fastener hole 127.

According to one embodiment of the present disclosure, the lower housing 140 may include a second fastener hole 144. The fastener 180 may be inserted into the second fastener hole 144. The fastener 180 may be the tapping screw 180. The tapping screw 180 may pass through the second fastener hole 144 to couple the upper housing 120 and the lower housing 140 while forming a spiral groove in the second fastener hole 144.

Referring to FIG. 4, an inner diameter D2 of the stator core 161 may be greater than an outer diameter D1 of the rotor 220.

The inner diameter D2 of the stator core 161 may be greater than the outer diameter D1 of the rotor 220 so as to receive the rotor 220. A gap G between the inner diameter D2 of the stator core 161 and the outer diameter D1 of the rotor 220 may be included to allow the stator core 161 and the rotor 220 to interact electromagnetically with each other so as to allow the rotor 220 to rotate inside the stator core 161. The gap G may be less than or equal to 1 mm. However, the size of the gap G is not limited thereto.

According to one of embodiments of the present disclosure, the bearings 230 and 240 may be seated in the plurality of seating holes 131 and 151, respectively. For example, the first bearing 230 may be seated in the first seating hole 131, and the second bearing 240 may be seated in the second seating hole 151. The bearings 230 and 240 may be disposed between the rotating shaft 210 and the forming ribs 133 and 153. For example, the first bearing 230 may be disposed between the rotating shaft 210 and the first forming rib 133, and the second bearing 240 may be disposed between the rotating shaft 210 and the second forming rib 153. Inner rings 231 and 241 of the bearings 230 and 240 may be in contact with the rotating shaft 210, and outer rings 233 and 243 of the bearings 230 and 240 may be in contact with the forming ribs 133 and 153 of the frame. For example, the inner ring 231 of the first bearing 230 may be in contact with the rotating shaft 210, and the outer ring 233 of the first bearing 230 may be in contact with the first forming rib 133. The inner ring 241 of the second bearing 240 may be in contact with the rotating shaft 210, and the outer ring 243 of the second bearing 240 may be in contact with the second forming rib 153.

The bearings 230 and 240 may include the inner rings 231 and 241, the outer rings 233 and 243, and balls 242 and 242, respectively.

An adhesive may be applied to couple the bearings 230 and 240 and the frames 130 and 150. For example, an adhesive member may be disposed between the bearings 230 and 240 and the frames 130 and 150. At least one adhesive member may be disposed between the first bearing 230 and the upper frame 130, and disposed between the second bearing 240 and the lower frame 150.

The first bearing 230 may be provided to have a larger cross-sectional area than the second bearing 240. The impeller 250 may be disposed above the first bearing 230. The first bearing 230 may have a larger cross-sectional area than the second bearing 240 to support a load of the impeller 250.

In addition, the plurality of seating holes 141 and 171 may have sizes corresponding to the bearings 230 and 240, respectively. Accordingly, the first seating hole 131 may be formed to be larger than the second seating hole 151. For example, the first seating hole 131 may have a larger area than the second seating hole 151.

Figure 5:
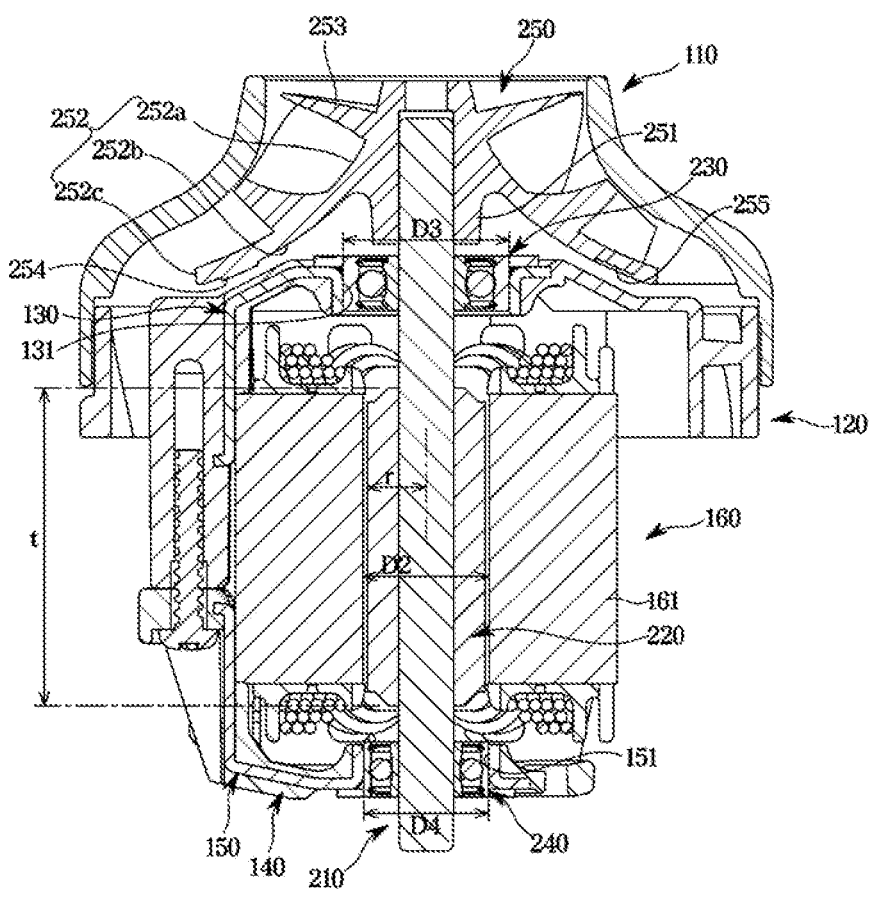
FIG. 5 is a cross-sectional view illustrating a state in which an impeller and a cover are assembled to some components of the motor shown in FIG. 4 according to one embodiment of the present disclosure.
Figure 6:
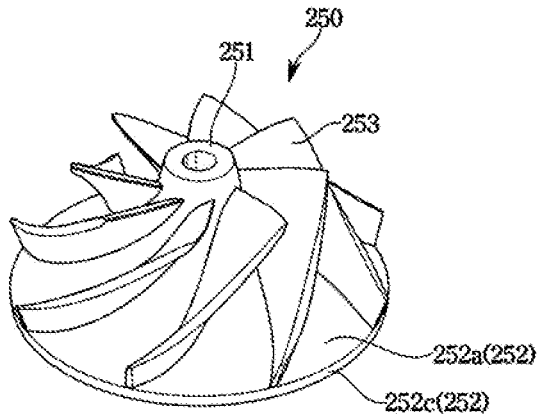
FIG. 6 is a view separately illustrating the impeller from the motor according to one embodiment of the present disclosure.
Figure 7:
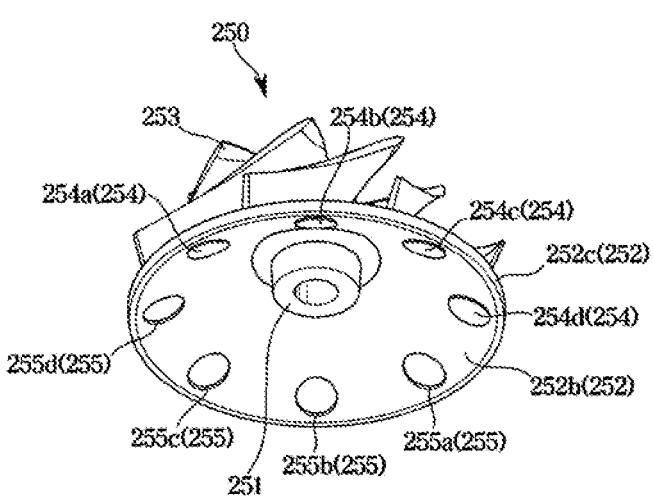
FIG. 7 is a view illustrating the impeller shown in FIG. 6 when viewed from another angle according to one embodiment of the present disclosure.

FIG. 5 is a cross-sectional view illustrating a state in which an impeller and a cover are assembled to some components of the motor shown in FIG. 4. FIG. 6 is a view separately illustrating the impeller from the motor according to one embodiment of the present disclosure. FIG. 7 is a view illustrating the impeller shown in FIG. 6 when viewed from another angle.

According to one embodiment of the present disclosure, an outer radius r of the rotor 220 may be less than 5 mm. A centrifugal force of the rotor 220 is proportional to an unbalanced mass of the rotor and a distance between the unbalanced mass and the rotation axis of the rotor. Therefore, in order to reduce the centrifugal force of the rotor 220, it is required to reduce the unbalanced mass or to reduce the distance between the unbalanced mass and the rotation axis of the rotor.

When the outer diameter r of the rotor 220 is reduced, the distance between the unbalanced mass and the rotation axis of the rotor is reduced. According to one embodiment of the present disclosure, the centrifugal force of the rotor 220 may be reduced by providing the outer radius r of the rotor 220 having less than 5 mm. Accordingly, the vibration of the rotor 220 may be reduced, and further, the vibration and noise of the motor 100 and the cleaner main body 10 may be reduced.

According to one embodiment of the present disclosure, a ratio (r/t) of the outer radius r of the rotor 220 and a length t of the rotor 220 in the axial direction of the rotating shaft 210 may be 0.17 to 0.26. As described above, the outer radius r of the rotor 220 is formed to be less than 5 mm, and thus by defining the ratio of the outer radius r and the length t in the axial direction, it is to reduce the centrifugal force of the rotor 220 and to allow the rotor 220 to electromagnetically interact with the stator 160 so as to have a sufficient rotational force.

According to the present disclosure, the inner diameter D2 of the stator core 161 may be provided greater than an outer diameter of at least one of the first bearing 230 and the second bearing 240. That is, the inner diameter D2 of the stator core 161 may be greater than one of an outer diameter D3 of the first bearing 230 and an outer diameter D4 of the second bearing 240. Referring to FIG. 5, the inner diameter D2 of the stator core 161 is greater than the outer diameter D4 of the second bearing 240. This is to allow the rotor assembly 200 to pass through the first housing 120 and be coupled to the housings 120 and 140. This will be described later.

Hereinafter the impeller 250 according to one embodiment of the present disclosure will be described in detail with reference to FIGS. 5 to 7.

According to one embodiment of the present disclosure, the impeller 250 may include a protrusion 254 or a groove 255 to correct for an imbalance of the impeller 250. The imbalance of the impeller 250 may specifically refer to dynamic unbalance.

The motor used in the cleaner may vibrate greatly due to high-speed rotation, and the vibration may cause noise in the cleaner. Most of the motor vibration is 1× vibration, and 1× vibration may be generated by the rotor assembly including the impeller, the rotor, the bearing and the rotating shaft. One of the ways to reduce 1× vibration is to reduce the imbalance of the rotor assembly.

Conventionally, a weight balancer is used to reduce the imbalance of the rotor assembly. Particularly, after assembling the weight balancer to the rotating shaft, balancing is performed by cutting a part of the weight balancer.

However, the balancing using a weight balancer causes an increase in the production time of the motor because the process of assembling the weight balancer and the balancing process of cutting the assembled weight balancer are added. In addition, the cost of the motor increases due to the process and the material cost of the weight balancer, and the weight of the motor increases due to a weight of the weight balancer, and thus the usability is reduced. In addition, when a part of the weight balancer is cut, there is a difficulty in that the weight balancer is scattered during high-speed rotation of the rotor. In addition, there is also a difficulty in that the balancing is not performed due to poor precision of the weight balancer itself.

According to the present disclosure, because the motor 100 removes the weight balancer, it is possible to provide the motor with improved stability during high-speed rotation, reduced material costs, and a simplified assembly process, and the cleaner including the same. In addition, it is possible to provide the motor having improved productivity and a reduced weight by removing the weight balancer, and the cleaner including the motor. In addition, it is possible to provide the motor capable of correcting for an imbalance of a rotor assembly through an impeller, and the cleaner including the same.

According to one embodiment of the present disclosure, the impeller 250 may include the shaft coupler 251 into which the rotating shaft 210 is inserted and coupled, and the hub 252 extending from an outer surface of the shaft coupler 251 and provided in a substantially disk shape. The shaft coupler 251 may be referred to as a boss member 251 as another expression.

The hub 252 may be provided in such a way that the cross-sectional area thereof becomes smaller along the axial direction of the rotating shaft 210. The hub 252 may include one surface 252a and the other surface 252b that is opposite to the one surface 252a. In addition, the hub 252 may include a side surface 252c connecting the one surface 252a and the other surface 252b. Hereinafter the one surface 252a of the hub 252 may refer to an outer surface 252a of the hub 252, and the other surface 252b of the hub 252 may refer to an inner surface of the hub 252, and the side surface 252c of the hub 252 may refer to a rim 252c of the hub 252.

The impeller 250 may include the plurality of blades 253 protruding from the outer surface 252a of the hub 252. The plurality of blades 253 may be provided to move air when the impeller 250 is rotated.

According to one embodiment of the present disclosure, the impeller 250 may include the protrusion 254 and/or the groove 255 provided to correct for the imbalance of the impeller 250.

The protrusion 254 may be provided on the inner surface 252b of the hub 252. The protrusion 254 may be disposed adjacent to the rim 252c of the hub 252. The protrusion 254 may include a plurality of protrusions 254a, 254b, 254c, and 254d, and the plurality of protrusions 254a, 254b, 254c, and 254d may be spaced apart along an outer edge of the hub 252 that corresponds to the inner surfaces 252b of the hub 252.

FIG. 7 illustrates that the plurality of protrusions 254a, 254b, 254c, and 254d is arranged in succession, it is not limited thereto. According to the present disclosure, a single protrusion 254 may be provided, and five or more of the protrusions 254 may be provided. In some cases, only the groove 255 may be provided without the protrusion 254.

The groove 255 may be provided on the inner surface 252b of the hub 252. The groove 255 may be disposed adjacent to the rim 252c of the hub 252. The groove 255 may include a plurality of grooves 255a, 255b, 255c, and 255d, and the plurality of grooves 255a, 255b, 255c, and 255d may be spaced apart along the outer edge of the hub 252 that corresponds to the inner surfaces 252b of the hub 252.

FIG. 7 illustrates that the plurality of grooves 255a, 255b, 255c, and 255d is arranged in succession, it is not limited thereto. According to the present disclosure, a single groove 255 may be provided, and five or more of the grooves 255 may be provided. In some cases, only the protrusion 254 may be provided without the groove 255.

The protrusion 254 or groove 255 may be simultaneously formed with the impeller 250. Particularly, the protrusion 254 or the groove 255 may be injected-molded together with the impeller 250 when the impeller 250 is injected-molded. The protrusion 254 and the groove 255 may be formed by adjusting a length of an ejector pin of an injection mold for injecting the impeller 250. That is, the number and position of the protrusions 254 and grooves 255 may be easily controlled by adjusting the length of the ejector pin when the impeller 250 is injected-molded.

According to the present disclosure, after measuring the imbalance in a state of the rotor assembly 200 in which the rotor 220, the bearings 230 and 240, and the impeller 250 are coupled to the rotating shaft 210, the rotor assembly 200 may be balanced by adjusting the number and position of the protrusions 254 or grooves 255 formed on the impeller 250.

Accordingly, it is possible to balance the rotor assembly 200 by adjusting the number and position of the protrusions 254 and grooves 255 of the impeller 250 without a weight balancer.

Figure 8:
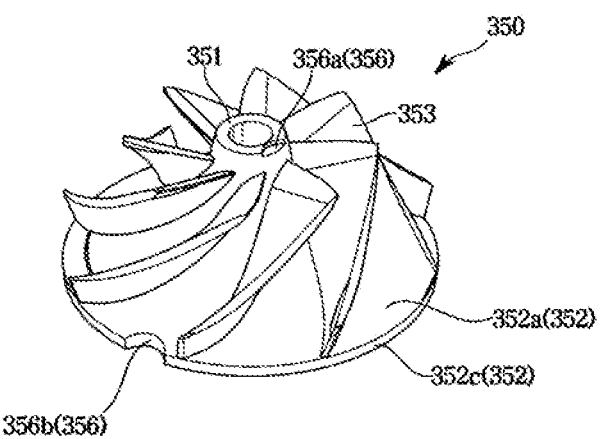
FIG. 8 is a view separately illustrating an impeller from a motor according to another embodiment of the present disclosure.

FIG. 8 is a view separately illustrating an impeller from a motor according to another embodiment of the present disclosure.

According to another embodiment of the present disclosure, an impeller 350 may include a plurality of recesses 356.

The impeller 350 may include a shaft coupler 351, a hub 352, and a plurality of blades 353, and the configurations are the same as those of the above-described embodiment. The hub 352 may include an outer surface 352a, an inner surface (not shown), and a rim 352c. Although not shown in the drawing, the impeller 350 may include a protrusion or groove provided on the inner surface of the hub 352.

According to another embodiment of the present disclosure, the impeller 350 may include a plurality of recesses 356a and 356b disposed spaced apart from each other in an axial direction of the rotating shaft 210.

The plurality of recesses 356a and 356b may include a first recess 356a and a second recess 356b. The first recess 356a and the second recess 356b may be spaced apart from each other in the axial direction.

The plurality of recesses 356 may be formed by cutting a portion of the impeller 350. For example, the first recess 356a may be formed by cutting a portion of the shaft coupler 351. The second recess 356b may be formed by cutting a portion of the hub 352. The second recess 356b may be formed by cutting a portion of an outer edge of the hub 352.

According to the present disclosure, three or more of recesses 356 may be provided. For example, the plurality of recesses 356 may further include a plurality of recesses (not shown) formed by cutting a portion of the outer edge of the hub 352 in addition to the second recess 356b. In addition, a portion of the inner surface 252b of the hub 352 may be cut or a portion of the shaft coupler 351 located on the lower side of the hub 352 may be cut.

That is, the number and position of the recesses 356 may be changed as needed during the balancing process of the rotor assembly 200.

According to another embodiment of the present disclosure, the impeller 350 may be primarily balanced using protrusions and grooves, and may be secondarily balanced using the plurality of recesses 356. That is, when the balancing is not obtained only with the protrusions and grooves, more precise balancing may be performed by cutting a part of the impeller 350 to form the plurality of recesses 356.

Figure 9:
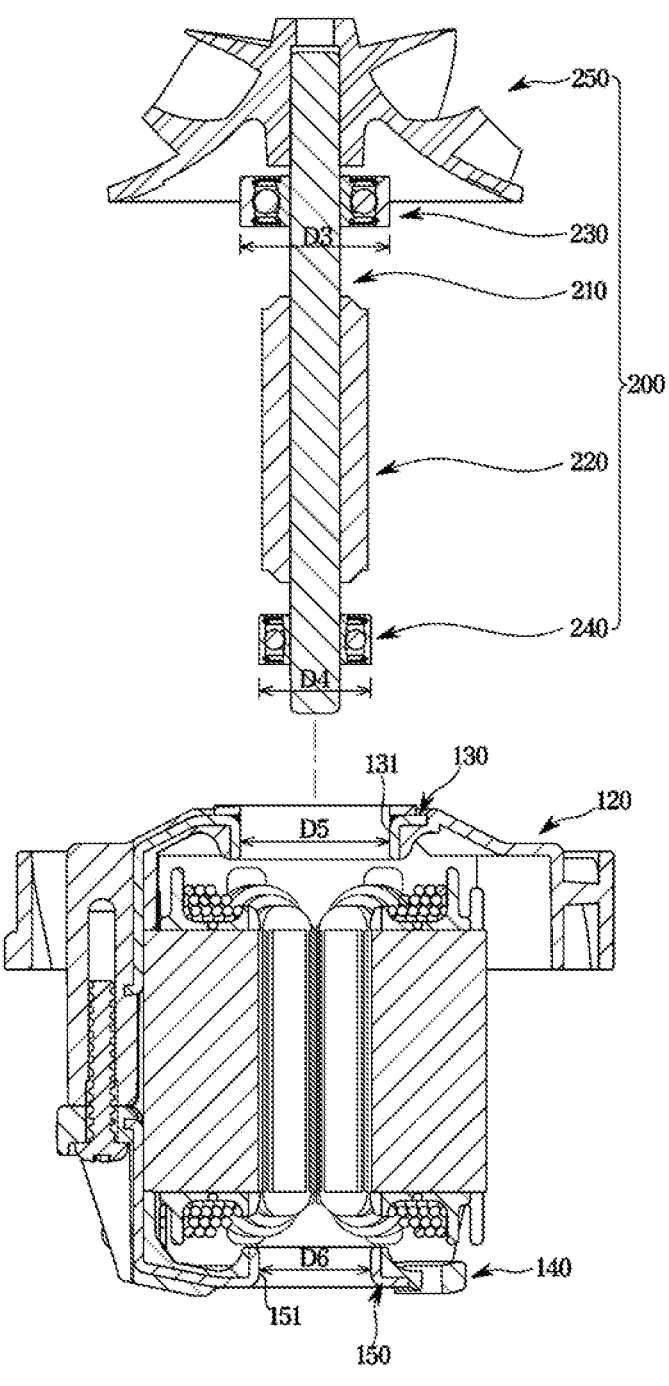
FIG. 9 is a view illustrating a state before a rotor assembly is coupled to a housing in the motor according to one embodiment of the present disclosure.
Figure 10:
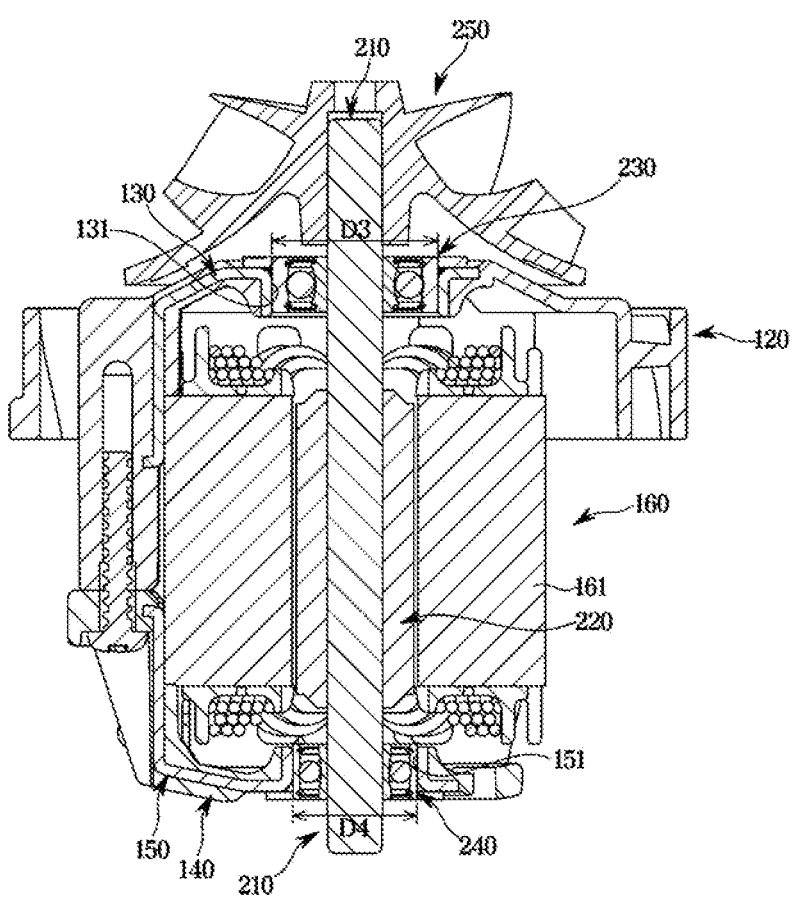
FIG. 10 is a view illustrating a state after the rotor assembly is coupled to the housing in the motor according to one embodiment of the present disclosure.

FIG. 9 is a view illustrating a state before a rotor assembly is coupled to a housing in the motor according to one embodiment of the present disclosure. FIG. 10 is a view illustrating a state after the rotor assembly is coupled to the housing in the motor according to one embodiment of the present disclosure.

Hereinafter a process of coupling the rotor assembly to the housing will be described in detail with reference to FIGS. 9 and 10.

According to the present disclosure, the rotor assembly 200 may be assembled to the housings 120 and 140 after passing through one side of the housings 120 and 140. That is, after the balancing is completed in the state of the rotor assembly 200, the rotor assembly 200 may be assembled to the housings 120 and 140.

Conventionally, ribs are formed on the upper frame and the lower frame to prevent the bearing from penetrating the housing. For example, a rib extending in a horizontal direction is formed at one side of the first forming rib forming the first seating hole to prevent the first bearing from penetrating the upper frame. Similarly, a rib extending in the horizontal direction is formed at one side of the second forming rib forming the second seating hole to prevent the second bearing from penetrating the lower frame.

In the conventional structure, the state of the rotor assembly in which the first bearing, the second bearing, the impeller, and the rotor are coupled to the rotating shaft may not be coupled to the housing. Therefore, the balancing may not be performed in the state of the rotor assembly, and the balancing may be performed after assembling the entire motor.

According to the present disclosure, the rotor assembly 200 may be assembled to the housings 120 and 140 in which the stator 160 is assembled. Particularly, the rotor assembly 200 may be assembled to the housings 120 and 140 after passing through the first seating hole 131 of the first housing 120 from the upper side.

The inner diameter D5 of the first seating hole 131 may be greater than the outer diameter D4 of the second bearing 240 and the outer diameter D1 of the rotor 220, so as to allow a portion of the rotor assembly 200 to pass through the first seating hole 131. In addition, the inner diameter D2 of the stator core 161 may be greater than the outer diameter D4 of the second bearing 240 and the outer diameter D1 of the rotor 220. With this structure, the first bearing 240 and the rotor 220 may pass through the first seating hole 131 and the inside of the stator core 161.

The outer diameter D3 of the first bearing 230 may be provided to correspond to the inner diameter D5 of the first seating hole 131 so as to allow the first bearing 230 to be assembled to the first housing 120. The inner diameter D5 of the first seating hole 131 may be less than or equal to the outer diameter D3 of the first bearing 230 to prevent the first bearing 230 from passing through the first seating hole 131. When the inner diameter D5 of the first seating hole 131 is less than the outer diameter D3 of the first bearing 230, the first bearing 230 may be fitted-coupled to the first seating hole 131.

The outer diameter D4 of the second bearing 240 may be provided to correspond to the inner diameter D6 of the seating hole 151 so as to allow the second bearing 240, which passes through the first seating hole 131 and the inside of the stator core 161, to be assembled to the second housing 140. The inner diameter D6 of the second seating hole 151 may be less than or equal to the outer diameter D4 of the second bearing 240 to prevent the second bearing 240 from passing through the second seating hole 151. When the inner diameter D6 of the second seating hole 151 is less than the outer diameter D4 of the second bearing 240, the second bearing 240 may be fitted-coupled to the second seating hole 151.

While the present disclosure has been particularly described with reference to exemplary embodiments, it should be understood by those of skilled in the art that various changes in form and details may be made without departing from the spirit and scope of the present disclosure.

What is claimed is:

1. A motor comprising:
   a stator;
   a rotating shaft arrangeable inside the stator, the rotating shaft rotatable about a rotation axis;
   a rotor coupleable to the rotating shaft, the rotor rotatable about the rotation axis of the rotating shaft by electromagnetically interacting with the stator while the rotating shaft is arranged inside the stator; and
   an impeller coupleable to the rotating shaft to generate a flow of air,
   wherein a plurality of protrusions or a plurality of grooves are formed on an inner surface of a hub which is opposite to a surface of the hub from which a plurality of blades protrude and facing inward toward the rotating shaft,
   wherein the impeller further comprises a plurality of recesses, distinct from the plurality of protrusions or the plurality of grooves, formed on the impeller to correct for an imbalance of the impeller, wherein the plurality of recesses are spaced apart from each other along an axial direction of the rotating shaft, wherein each of the plurality of recesses is formed by cutting at least a portion of the impeller.

2. The motor of claim 1, wherein the impeller comprises:
a shaft coupler to which the rotating shaft is coupleable;
a hub extending from an outer surface of the shaft coupler so as to allow the shaft coupler to be arranged at a center of the impeller; and
a plurality of blades protruding from one surface of the hub.

3. The motor of claim 1, wherein
the plurality of protrusions or the plurality of grooves is formed at a position adjacent to a rim of the hub.

4. The motor of claim 1, wherein
the plurality of protrusions or the plurality of grooves are injected-molded together with the impeller which is injected-molded.

5. The motor of claim 1, wherein
an outer radius of the rotor is less than 5 mm to reduce a centrifugal force of the rotor.

6. The motor of claim 1, wherein
when an outer radius of the rotor is r and a length of the rotor along an axial direction of the rotating shaft is t,
an equation r/t=0.17 to 0.26 is satisfied.

7. The motor of claim 1, further comprising:

a housing to accommodate the stator and the rotor; and
a bearing, coupleable to the housing, to support the rotating shaft to allow the rotor to be rotated relative to the stator while maintaining a predetermined gap therebetween.

8. The motor of claim 7, wherein
the housing comprises a first housing to cover one side of the stator and the rotor; and a second housing to cover another side of the stator and the rotor,
wherein the bearing comprises a first bearing coupleable to the first housing and a second bearing coupleable to the second housing.

9. The motor of claim 8, wherein
a rotor assembly, with which the impeller, the rotor, the first bearing, and the second bearing are coupleable to the rotating shaft, is coupleable to the housing by passing through the first housing or the second housing.

10. The motor of claim 9, wherein
the first housing or the second housing comprises an opening larger than an outer diameter of the first bearing or the second bearing to allow the rotor assembly to pass therethrough.

* * * * *